United States Patent [19]

Scheuermann

[11] 3,880,857
[45] Apr. 29, 1975

[54] 4-ALKOXY-N-AMINONAPHTHALIC ACID IMIDES AS OPTICAL BRIGHTNERS

[75] Inventor: Horst Scheuermann, Ludwigshafen, Germany

[73] Assignee: Badische Anilin- & Soda-Fabrik Aktiengesellschaft, Ludwigshafen, Germany

[22] Filed: Aug. 26, 1971

[21] Appl. No.: 175,327

[30] Foreign Application Priority Data
Sept. 3, 1970  Germany............................ 2043662

[52] U.S. Cl............ 260/281; 8/11 W; 260/247.1 L; 260/247.2 A
[51] Int. Cl............................................. C07d 39/00
[58] Field of Search................................. 260/281

[56] References Cited
UNITED STATES PATENTS

| | | | |
|---|---|---|---|
| 2,006,017 | 6/1935 | Eckert | 260/281 |
| 2,600,080 | 6/1952 | Shrader | 260/281 |
| 3,310,564 | 3/1967 | Kasai | 260/281 |
| 3,330,834 | 7/1967 | Senshu | 260/281 |
| 3,546,227 | 12/1970 | Gmundler et al. | 260/281 |
| 3,661,912 | 5/1972 | Kalz | 260/281 |
| 3,697,526 | 10/1972 | Pugin | 260/281 |
| 3,798,224 | 3/1974 | Hotta | 260/281 |

FOREIGN PATENTS OR APPLICATIONS

| | | | |
|---|---|---|---|
| 2,064,159 | 7/1971 | Germany | 260/281 |

OTHER PUBLICATIONS

Dine–Hart, Jour. Polymer Sci. Vol. 6, pp. 2755–2764 (1968).

*Primary Examiner*—Donald G. Daus
*Attorney, Agent, or Firm*—Johnston, Keil, Thompson & Shurtleff

[57] ABSTRACT

Optical brighteners of the formula:

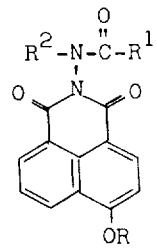

derived from 4-alkoxy-N-aminonaphthalic acid imides. The compounds are useful for brightening acrylonitrile polymers, polyamides, cellulose esters and polyesters.

1 Claim, No Drawings

4-ALKOXY-N-AMINONAPHTHALIC ACID IMIDES AS OPTICAL BRIGHTNERS

The invention relates to optical brighteners having the general formula (I):

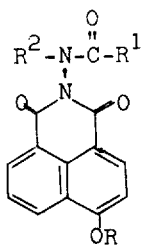

in which R denotes unsubstituted or substituted alkyl, aralkyl or cycloalkyl;

$R^1$ denotes an unsubstituted or substituted alkyl, aryl or heterocyclic radical or alkoxy, phenoxy, alkylamino or arylamino;

$R^2$ denotes hydrogen or alkyl having one to four carbon atoms, aralkyl, cycloalkyl or aryl; and $R^1$ and $R^2$ together denote a radical having the formula:

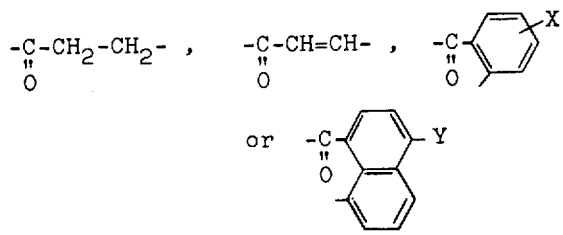

where X denotes hydrogen, chlorine, methyl, methoxy, ethoxy, carbomethoxy or carboethoxy, and Y denotes hydrogen, chlorine, bromine or the radical OR.

Examples of alkyl radicals R are unsubstituted or substituted linear or branched alkyl groups having one to four carbon atoms. Specific examples of R are methyl, ethyl, isopropyl, butyl, isobutyl, benzyl, phenylethyl, methoxyethyl, butoxyethyl or cyclohexyl.

Examples of radicals $R^1$ are linear or branched groups having up to eight carbon atoms which may bear cyano, chlorine, bromine, alkoxy or dialkylamino as substituents. Aryl radicals $R^1$ may for example bear chlorine, bromine, methyl, ethyl, methoxy, ethoxy, dimethylamino, carbomethoxy, carboethoxy or cyano as substituents. Heterocyclic radicals $R^1$ may be derived for example from thiophene, furan, thiazole, imidazole, pyridine or quinoline.

Specific examples of $R^1$ are: methyl, ethyl, n-propyl, isopropyl, n-butyl, isobutyl, α-ethylpentyl, chloromethyl, methoxymethyl, ethoxymethyl, β-methoxyethyl, β-ethoxyethyl, β-butoxyethyl, cyanomethyl, β-dimethylaminoethyl, β-diethylaminoethyl, β-dibutylaminoethyl, α-morpholinomethyl, α-piperidinomethyl, α-N-methylpiperazinomethyl, phenyl, o-chlorophenyl, m-chlorophenyl, p-chlorophenyl, 3,4-dichlorophenyl, 2-chloro-4-methylphenyl, o-methylphenyl, m-methylphenyl, p-methylphenyl, o-methoxyphenyl, m-methoxyphenyl, p-methoxyphenyl, o-ethoxyphenyl, m-ethoxyphenyl, p-ethoxyphenyl, p-bromophenyl, p-cyanophenyl, p-carbomethoxyphenyl, p-carboethoxyphenyl, 2-thenyl, 5-chloromethyl-2-thenyl, 2-furyl, 5-chloromethyl-2-furyl, 2-amino-4-methylthiazolyl-(5), 2-phenyl-4-methylthiazolyl-(5), 4-imidazolyl, 3-pyridinyl, 4-pyridinyl, 4-quinolinyl, 8-quinolinyl, methoxy, ethoxy, butoxy, phenoxy, ethylamino, propylamino, cyclohexylamino, phenylamino, m-methylphenylamino, m-chlorophenylamino, p-chlorophenylamino or 3,4-dichlorophenylamino.

Examples of $R^2$, in addition to hydrogen, are: methyl, ethyl, butyl, cyclohexyl, benzyl, phenylethyl, phenyl, p-chlorophenyl, m-methylphenyl, p-methylphenyl, p-sulfonamidophenyl, p-N,N-dialkylsulfonamidophenyl, p-carbomethoxyphenyl or p-carboethoxy phenyl and also the radicals having the formulae

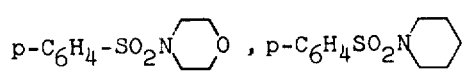

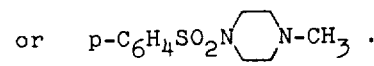

The invention relates in particular to compounds having the formula:

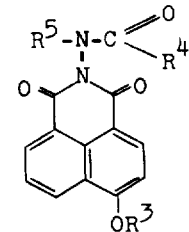

in which
$R^3$ denotes alkyl having one to four carbon atoms or methoxyethyl;
$R^4$ denotes alkyl having one to seven carbon atoms, chloromethyl, cyanomethyl, alkoxyalkyl having a total of two to six carbon atoms, phenyl, chlorophenyl, methylphenyl, methoxyphenyl, ethoxyphenyl or a radical of the formula:

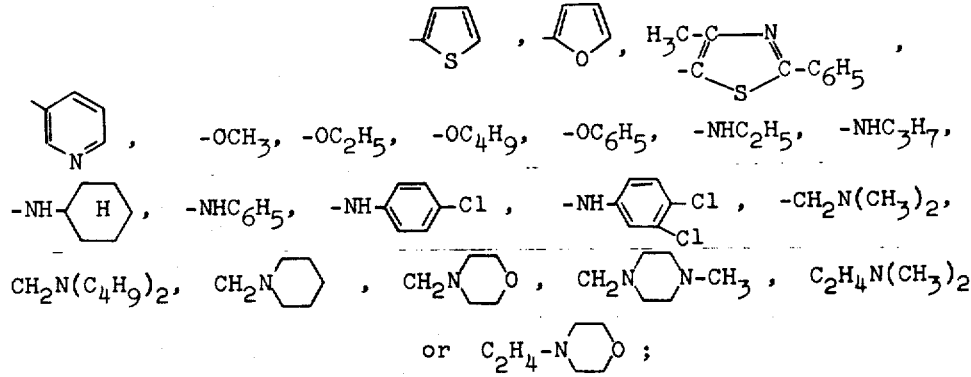

$R^3$ denotes hydrogen, alkyl having one to four carbon atoms or phenyl;

$R^4$ and $R^5$ together with the groups attached to them may denote a radical having the formula:

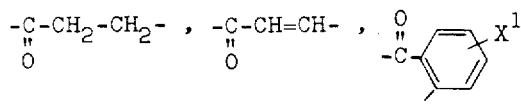

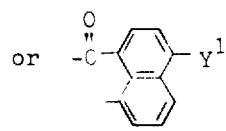

$X^1$ denotes hydrogen, chlorine, methyl or methoxy; and $Y^1$ denotes hydrogen, chlorine or the radical —$OR^3$.

Compounds having special industrial importance are those having the general formula:

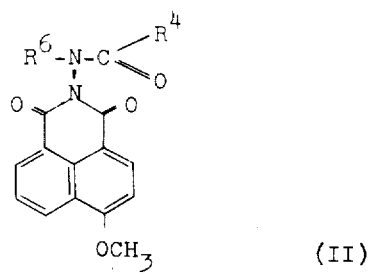

where $R^4$ has the meanings given above,
$R^6$ denotes hydrogen, methyl or phenyl; and
$R^4$ and $R^6$ together denote a radical having the formula

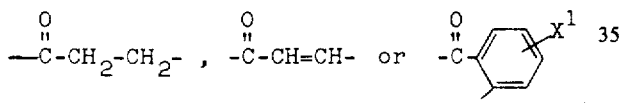

Heterocyclic radicals $R^4$ are preferred.

The production of compounds having the formula (I) may be carried out for example according to the following scheme:

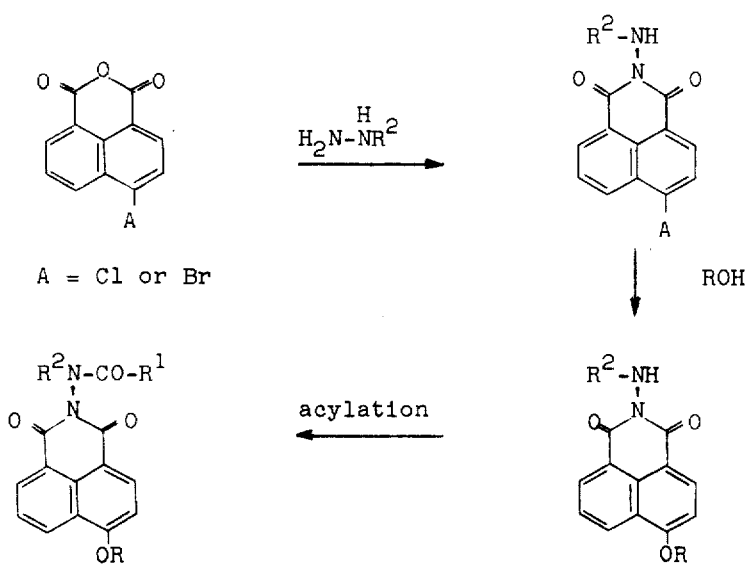

A = Cl or Br

Naphthalic anhydride-4-sulfonic acid may also be reacted with a hydrazine having the formula: $H_2N$—$NHR^2$, the sulfonic acid group replaced by a hydroxyl group, the latter alkylated with introduction of the radical R and the intermediate thus obtained acylated with the introduction of the radical $R^1$—CO.

The reactions are known in principle and proceed analogously under comparable conditions.

The compounds having the formula (I) are colorless to pale yellow and are suitable as optical brighteners for synthetic fibers such as acrylonitrile polymers, polyamides and particularly cellulose esters and polyesters.

The following Examples illustrate the invention. Parts and percentages are by weight unless otherwise stated.

EXAMPLE 1

24.2 parts of 4-methoxy-N-aminonaphthalimide is dissolved in 100 parts of acetic anhydride, 3 parts of concentrated sulfuric acid is added and the whole is heated for 2 hours at 65° to 70°C and then allowed to cool. The reaction mixture is poured onto 200 parts of ice, stirred for one hour and the precipitate suction filtered, washed with water and dried. 18.7 parts (66% of theory) of the compound having the constitution:

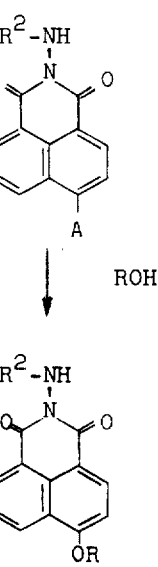

is obtained which, after recrystallization from n-butanol, melts at from 194° to 195°C.

The 4-methoxy-N-aminonaphthalimide required for the production of this acetyl compound is prepared as follows: 246.5 parts of 4-chloro-N-aminonaphthalimide is suspended in 800 parts of methanol and then 240 parts of a 30% solution of sodium methylate in methanol is added. This mixture is then boiled for nine hours, acidified with glacial acetic acid and stirred into 1,000 parts of water. The precipitate is suction filtered, washed with water and dried. 220 parts (91% of theory) of 4-methoxy-N-aminonaphthalimide is obtained which melts at 241° to 242°C 4-chloro-N-aminonaphthalimide is obtained by the following method: a solution of 232.5 parts of 4-chloronaphthalic anhydride in 700 parts of dimethylformamide is heated to 130° to 140°C and then 55 parts of hydrazine hydrate is dripped in. After the whole has been stirred for four hours at 130° to 140°C it is cooled to 5° to 10°C, and the precipitate is suction filtered, washed with 200 parts of methanol and dried. 190 parts (77% of theory) of 4-chloro-N-aminonaphthalimide is obtained having a melting point of 223° to 225°C.

The following naphthalimide derivatives are obtained analogously to Example 1 from the corresponding 4-alkoxy-N-aminonaphthalimides with acetic anhydride:

parts of acetone is dripped at 20° to 25°C into a suspension of 24.2 parts of 4-methoxy-N-aminonaphthalimide and 13.8 parts of potassium carbonate in 100 parts of acetone. After stirring for three hours a pH of 3 to 4 is set up with glacial acetic acid and the mixture is stirred into 300 parts of water. The precipitate is suction filtered, washed with water, dried and recrystallized from methanol. 25 parts (84% of theory) of the compound having the constitution:

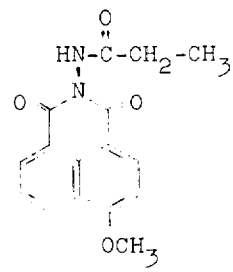

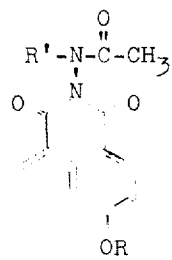

| Example | R | R' | Melting point (°C) |
|---------|---|----|---------------------|
| 2 | C₂H₅ | H | 212 to 214 |
| 3 | CH₂CH₂OCH₃ | H | 101 to 102 |
| 4 | CH₃ | CH₃ | 241 to 242 |
| 5 | CH₃ | C₆H₅ | 198 to 199 |

EXAMPLE 6

A solution of 11.1 parts of propionyl chloride in 25 parts is obtained which melts at 231° to 232°C.

The following naphthalimide derivatives are prepared analogously to Example 6:

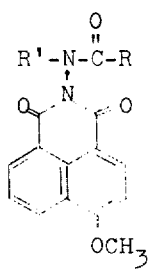

| Example | R | R' | Melting point (°C) |
|---------|---|----|---------------------|
| 7 | -CH(CH₃)CH₃ | H | 214 to 215 |
| 8 | -CH₂-Cl | H | 263 to 264 |
| 9 | -CH(C₂H₅)C₄H₉ | H | 190 to 191 |

| Example | R | R' | Melting point (°C) |
|---|---|---|---|
| 10 | $-C_6H_5$ | H | 210 to 211 |
| 11 | $-C_6H_4-CH_3$ | H | 266 to 267 |
| 12 | $-CH_2-CH(CH_3)_2$ | $CH_3$ | 153 to 155 |
| 13 | $-CH_2-Cl$ | $C_6H_5$ | 237 to 238 |
| 14 | $-CH(C_2H_5)(C_4H_9)$ | $C_6H_5$ | 151 to 152 |

EXAMPLE 15

17.6 parts of thiophene-2-carboxylic acid chloride is dripped into a suspension of 24.2 parts of 4-methoxy-N-aminonaphthalimide in 100 parts of pyridine at 50° to 60°C. After the mixture has been stirred for three hours at 65° to 70°C, it is acidified with glacial acetic acid and stirred into 300 parts of water. The precipitate is suction filtered, washed with water, dried and recrystallized from n-butanol. 27 parts (77% of theory) of the compound having the formula:

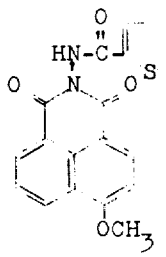

is obtained which melts at 223° to 225°C.

The following naphthalimide derivatives are obtained as in Example 13 with the appropriate carboxylic acid chlorides:

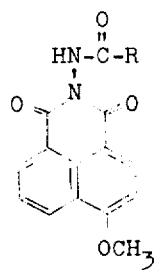

EXAMPLE 18

17.8 parts of phthalic anhydride is introduced at 70° to 75°C into a solution of 24.2 parts of 4-methoxy-N-aminonaphthalimide in 120 parts of pyridine. The mixture is stirred for five hours at 70° to 75°C, cooled to 20° to 25°C, 300 parts of water is added and the precipitate is suction filtered, washed with water, dried and recrystallized from methyl glycol. 23 parts (62% of theory) of the compound

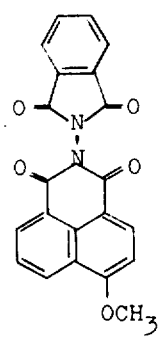

is obtained. The compound melts at 297° to 299°C.

EXAMPLE 19

19.8 parts of naphthalic anhydride is added at 95° to

| Example | R | Melting point (°C) |
|---|---|---|
| 16 | (furyl) | 216 to 218 |
| 17 | $H_3C$-thiazole-$C_6H_5$ | 266 to 267 |

100°C to a solution of 24.2 parts of 4-methoxy-N-aminonaphthalimide in 350 parts of glacial acetic acid. The solution is heated for 6 hours at 115° to 120°C, stirred into 1,000 parts of water and the precipitate is suction filtered, washed with water, dried and recrystallized from dimethylformamide. 24 parts (57% of theory) of the compound having the formula:

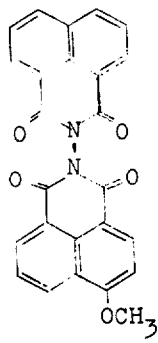

is obtained which melts at 330° to 334°C.

EXAMPLE 20

46.1 parts of the compound having the formula:

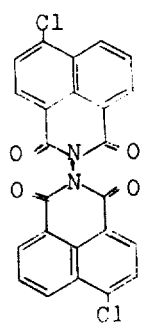

is suspended in 300 parts of methanol and then 144 parts of a 30% solution of sodium methylate is added to the mixture. The mixture is heated for 24 hours at 65° to 70°C, acidified with glacial acetic acid, stirred into 1,000 parts of water, suction filtered, washed with water and methanol and dried. 23 parts (51% of theory) of the compound having the formula:

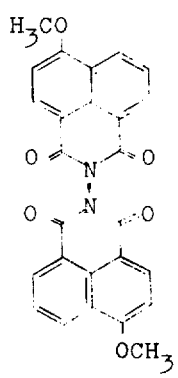

is obtained which melts at 330° to 336°C.

EXAMPLE 21

13.1 parts of phenyl isocyanate is dripped at 65° to 70°C into 24.2 parts of 4-methoxy-N-aminonaphthalimide in 100 parts of pyridine. The mixture is stirred for 6 hours at 70°C, acidified with glacial acetic acid and stirred into 300 parts of water. The precipitate is suction filtered, washed with water and methanol, dried and dissolved in and reprecipitated from dimethylformamide and methanol. 21 parts (58% of theory) of the compound having the formula:

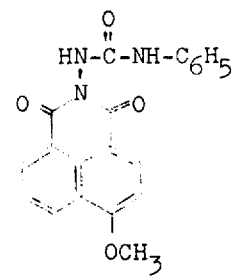

is obtained which melts at 295° to 296°C.

EXAMPLE 22

14.1 parts of ethyl chloroformate is added to 31.8 parts of 4-methoxy-N-phenylaminonaphthalimide in 150 parts of nitrobenzene and this mixture is heated for eight hours at 130° to 140°C. The nitrobenzene is then removed by steam distillation and the residue is suction filtered, dried and recrystallized twice from isobutanol. 18 parts (46% of theory) of the compound having the formula:

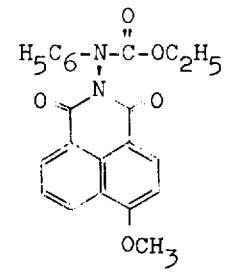

is obtained which melts at 203° to 204°C.

EXAMPLE 23

11.8 parts of maleic anhydride is added at 75° to 80°C to a solution of 24.2 parts of 4-methoxy-N-aminonaphthalimide in 120 parts of pyridine, the mixture is stirred for five hours at 80° to 90°C, 300 parts of water is added and the precipitate is suction filtered, washed with water, dried and recrystallized several times from dimethylformamide and methanol. 7 parts (22% of theory) of the compound having the formula:

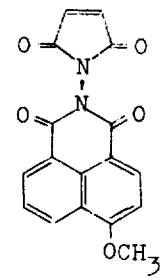

is obtained which melts at 320° to 326°C.

By methods analogous to those described in the Examples, the optical brighteners characterized in the following Table by their substituents are obtained:

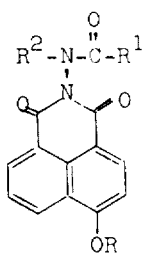

| Example | R | $R^1$ | $R^2$ |
|---------|---|-------|-------|
| 24 | $C_2H_4OC_4H_9$ | $CH_3$ | H |
| 25 | $C_2H_4OC_2H_5$ | $CH_3$ | H |
| 26 | $CH_2C_6H_5$ | $CH_3$ | H |
| 27 | $CH_2C_6H_5$ | $CH_3$ | $CH_3$ |
| 28 | $CH_2C_6H_5$ | $CH_3$ | $C_6H_5$ |
| 29 | $C_2H_4-C_6H_5$ | $CH_3$ | H |
| 30 | $C_2H_4-C_6H_5$ | $CH_3$ | $CH_3$ |
| 31 | ⟨H⟩- | $CH_3$ | H |
| 32 | $CH_3$ | $-CH_2OCH_3$ | H |
| 33 | $CH_3$ | $CH_2OC_2H_5$ | $C_6H_5$ |
| 34 | $CH_3$ | $C_2H_4OC_4H_9$ | $C_6H_5$ |
| 35 | $CH_3$ | $CH_2CN$ | H |
| 36 | $CH_3$ | $C_2H_4N(CH_3)_2$ | $CH_3$ |
| 37 | $CH_3$ | $C_2H_4N(C_4H_9)_2$ | $CH_3$ |
| 38 | $CH_3$ | $CH_2N(CH_3)_2$ | H |
| 39 | $CH_3$ | $CH_2-N\bigcirc O$ | H |
| 40 | $CH_3$ | $CH_2-N\langle H\rangle$ | H |
| 41 | $CH_3$ | $CH_2-N\bigcirc N-CH_3$ | H |
| 42 | $CH_3$ | $p-C_6H_4Cl$ | $CH_2C_6H_5$ |
| 43 | $CH_3$ | $o-C_6H_4Cl$ | ⟨H⟩ |
| 44 | $CH_3$ | ⟨⟩-Cl, Cl | $C_4H_9$ |
| 45 | $CH_3$ | Cl-⟨⟩-$CH_3$ | $C_2H_5$ |
| 46 | $CH_3$ | $p-C_6H_4OC_2H_5$ | $p-C_6H_4Cl$ |

What is claimed is:
1. The optical brightener of the formula
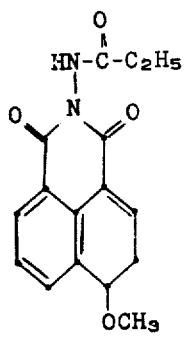

| Example | R | R¹ | R² |
|---|---|---|---|
| 47 | $CH_3$ | $p\text{-}C_6H_4CN$ | H |
| 48 | $CH_3$ | $p\text{-}C_6H_4COOCH_3$ | H |
| 49 | $CH_3$ | $p\text{-}C_6H_4COOC_4H_9$ | H |
| 50 | $CH_3$ | 5-(chloromethyl)thiophen-2-yl | H |
| 51 | $CH_3$ | 2-amino-4-methylthiazol-5-yl | H |
| 52 | $CH_3$ | imidazol-4-yl | H |
| 53 | $CH_3$ | pyridin-3-yl | $CH_3$ |
| 54 | $CH_3$ | quinolin-4-yl | $CH_3$ |
| 55 | $CH_3$ | $OC_4H_9$ | $C_6H_5$ |
| 56 | $CH_3$ | $OC_6H_5$ | H |
| 57 | $CH_3$ | $NHC_2H_5$ | H |
| 58 | $CH_3$ | NH-cyclohexyl | H |
| 59 | $CH_3$ | NH-(3-methylphenyl) | H |
| 60 | $CH_3$ | NH-(3,4-dichlorophenyl) | H |
| 61 | $CH_3$ | NH-(4-chlorophenyl) | H |
| 62 | $CH_3$ | $CH_3$ | $C_2H_4C_6H_5$ |
| 63 | $CH_3$ | $CH_3$ | $p\text{-}C_6H_4CH_3$ |
| 64 | $CH_3$ | $CH_3$ | $p\text{-}C_6H_4SO_2NH_2$ |
| 65 | $CH_3$ | $CH_3$ | $p\text{-}C_6H_4SO_2\text{-morpholino}$ |
| 66 | $CH_3$ | $CH_3$ | $p\text{-}C_6H_4SO_2\text{-piperidino}$ |
| 67 | $CH_3$ | $CH_3$ | $p\text{-}C_6H_4SO_2\text{-(4-methylpiperazin-1-yl)}$ |
| 68 | $CH_3$ | $CH_3$ | $p\text{-}C_6H_4SO_2N(CH_3)_2$ |
| 69 | $CH_3$ | $CH_3$ | $p\text{-}C_6H_4SO_2N(C_4H_9)_2$ |
| 70 | $CH_3$ | $i\text{-}C_4H_9$ | $p\text{-}C_6H_4CO_2CH_3$ |